United States Patent Office 2,962,511
Patented Nov. 29, 1960

2,962,511

SUBSTITUTED BENZENESULFONYLHYDRAZONES (O)

Hans Willi Zimmer, Cincinnati, Ohio, assignor to The Chattanooga Medicine Company, Chattanooga, Tenn., a corporation of Tennessee No Drawing. Filed July 1, 1958, Ser. No. 745,825

5 Claims. (Cl. 260—397.7)

The instant invention relates to novel organic compounds, and more particularly, to novel substituted benzenesulfonylhydrazones.

Although the compounds of the invention may have a number of uses in various fields, they may be found to be particularly useful as sun screen agents, foaming agents and chemotherapeutic agents. A desirable ingredient for "sun tan" lotions is a sun screen agent with high absorption of ultraviolet radiation in the neighborhood of 2970 A. (which wavelength produces undesirable reddening effect on the skin) and low absorption of light radiation in the neighborhood of 3400 A. (which wavelength produces the maximum tanning effect). The instant compounds possess such absorption spectral characteristics.

Also, the instant compounds may undergo decomposition upon melting and such decomposition is accompanied by the evolution of a large volume of gas, so that these compounds may be added to molten plastic or synthetic resin materials to act as foaming agents therefor.

In addition, the compounds of the invention may display anti-bacterial activity comparable to that of the well known sulfa drugs, sulfanilamide and sulfadiazine. In this respect, it should be noted that certain bacteria such as *Streptococcus pyogenes, Micrococcus pyogenes,* and *Escherichia coli* tend to become resistant to the known sulfa drugs, although they may be particularly sensitive to a new sulfa compound. It is believed that exposure of such bacteria to known sulfa drugs often tends to result in the survival of a strain resistant to such sulfa drugs, but still sensitive to a new sulfa drug to which the strain has not yet been exposed. There is thus a great need for new compounds which display antibacterial activity.

It is, therefore, an important object of the instant invention to provide new and useful substituted benzenesulfonylhydrazones.

It is another object of the instant invention to provide new and useful acetamino- or amino-substituted benzenesulfonylhydrazones of aldehydes and ketones containing a benzene nucleus having hydroxy, thiol, nitro or halo substituents thereon.

Yet another object of the instant invention is to provide new compounds useful as sun screen agents, foaming agents and/or chemotherapeutic agents.

Other and further objects, features and advantages of the present invention will become apparent to those skilled in the art from the following detailed disclosure thereof.

The instant invention consists in the compound having the formula:

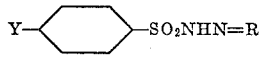

wherein Y is a monovalent radical selected from the group consisting of —NH$_2$ and —NHCOCH$_3$, and R is a radical containing at least one benzene nucleus having at least one nuclear monovalent substituent selected from the class consisting of —OH, —NO$_2$, and —Cl.

As indicated, the radical Y may be —NH$_2$ or —NHCOCH$_3$, so that the instant compounds are p-aminobenzenesulfonylhydrazones or p-acetamidobenzenesulfonylhydrazones, of selected aldehydes or ketones.

In each case, these are aldehydes or ketones containing at least one benzene nucleus having at least one nuclear monovalent substituent selected from the class consisting of —OH, —SH, —NO$_2$, and halo (i.e. fluoro, chloro, bromo or iodo). Preferably there are one to two benzene nuclei in the radical R (or in the aldehyde or ketone). One of such benzene nuclei must contain at least one hydroxy, nitro or chloro substituent. In addition, such benzene nucleus may contain (beyond the necessary single hydroxy, nitro or halo group) other groups such as thiol, hydroxy, nitro, bromo, fluoro, chloro, C$_1$–C$_4$ alkoxy, C$_1$–C$_6$ alkyl, or the like monovalent groups. Preferably such benzene nucleus contains a total of not more than three nuclear substituents.

In addition to the benzene nucleus (or nuclei) in the radical R, there may be aliphatic groups. One such aliphatic group is preferably a "linking" C$_1$–C$_6$ hydrocarbon group connecting the benzene nucleus with the hydrazine N. The radical R may thus have the following formula:

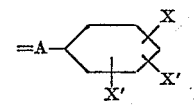

wherein X is —OH, —SH, —NO$_2$ or halo; each X' is —SH, —OH, —NO$_2$, —F, —Br, —I, —Cl, H, C$_1$–C$_4$ alkoxy, or C$_1$–C$_6$ alkyl; and A is a trivalent C$_1$–C$_6$ aliphatic hydrocarbon group, such as

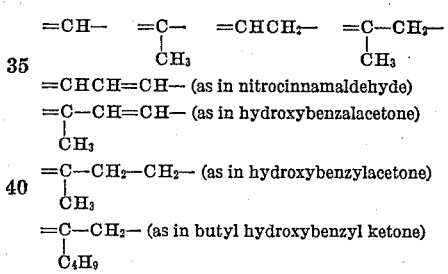

=CHCH=CH— (as in nitrocinnamaldehyde)

=C—CH=CH— (as in hydroxybenzalacetone)
|
CH$_3$

=C—CH$_2$—CH$_2$— (as in hydroxybenzylacetone)
|
CH$_3$

=C—CH$_2$— (as in butyl hydroxybenzyl ketone)
|
C$_4$H$_9$

Preferably, R does not contain more than one —OH, more than one —NO$_2$, or more than two —Cl groups.

Typical compounds of the invention include the following:

p-aminobenzenesulfonylhydrazone of salicylaldehyde:

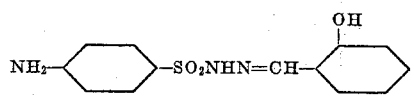

p-aminobenzenesulfonylhydrazone of 5-nitrosalicylaldehyde:

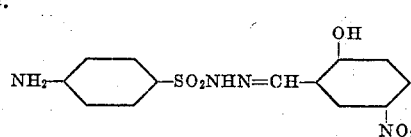

p-aminobenzenesulfonylhydrazone of m-nitrocinnamaldehyde:

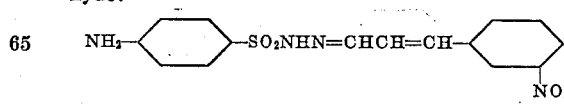

p-aminobenzenesulfonylhydrazone of p-hydroxybenzylacetone:

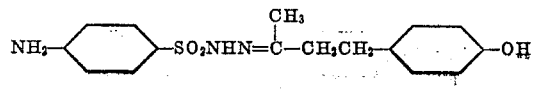

p - aminobenzenesulfonylhydrazone of o - hydroxyacetophenone:

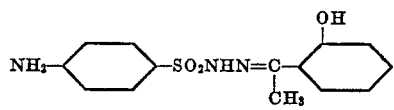

p-aminobenzenesulfonylhydrazone of p-chlorobenzaldehyde:

p-aminobenzenesulfonylhydrazone of 3,4-dichlorobenzaldehyde:

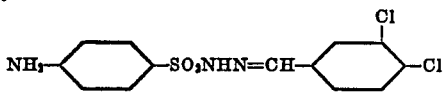

p-aminobenzenesulfonylhydrazone of vanillin:

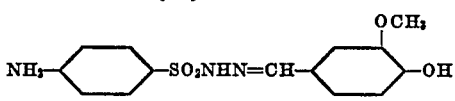

p - aminobenzenesulfonylhydrazone of o - nitrobenzaldehyde:

p-aminobenzenesulfonylhydrazone of 2-hydroxy-3-nitro-5-methyl acetophenone:

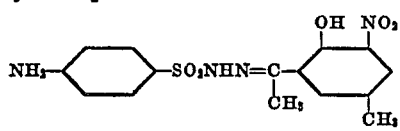

p - aminobenzenesulfonylhydrazone of m-nitrobenzaldehyde:

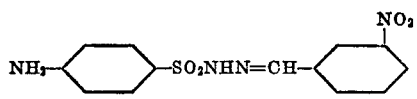

p-acetamidobenzenesulfonylhydrazone of salicylaldehyde:

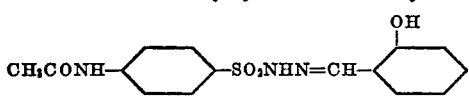

p-acetamidobenzenesulfonylhydrazone of o-hydroxyacetophenone:

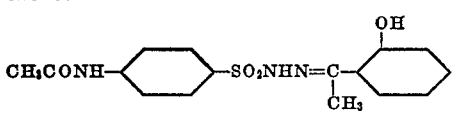

p-acetamidobenzenesulfonylhydrazone of 2 - hydroxy - 5 - nitrobenzaldehyde:

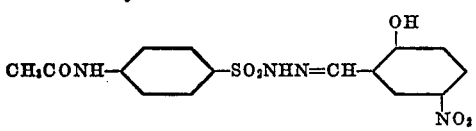

p-acetamidobenzenesulfonylhydrazone of 2-hydroxy-3-nitro-5-methyl acetophenone:

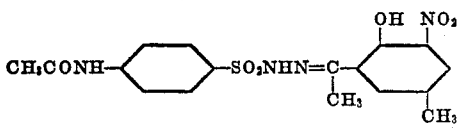

p-acetamidobenzenesulfonylhydrazone of m-nitrobenzaldehyde:

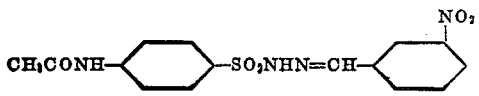

p-acetamidobenzenesulfonylhydrazone of vanillin:

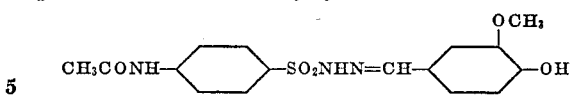

p-acetamidobenzenesulfonylhydrazone of 3,4-dichlorobenzaldehyde:

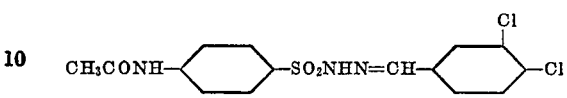

p - acetamidobenzenesulfonylhydrazone of m - nitrocinnamaldehyde:

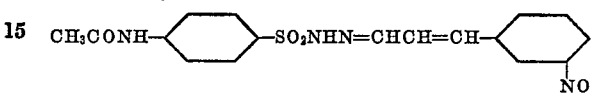

p-acetamidobenzenesulfonylhydrazone of p-hydroxybenzylacetone:

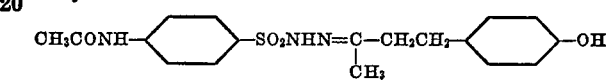

p-acetamidobenzenesulfonylhydrazone of butyl p-hydroxyphenyl ketone:

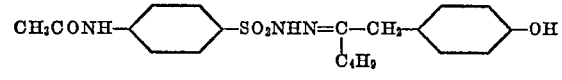

p-aminobenzenesulfonylhydrazone of thiosalicylaldehyde:

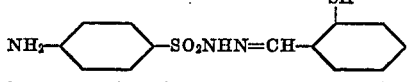

p-aminobenzenesulfonylhydrazone of m-sulfhydryl cinnamaldehyde:

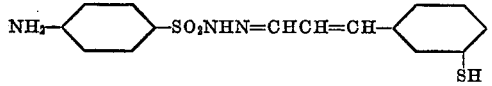

p-aminobenzenesulfonylhydrazone of p-bromobenzaldehyde:

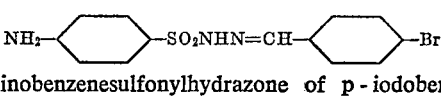

p - aminobenzenesulfonylhydrazone of p - iodobenzaldehyde:

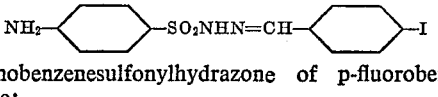

p-aminobenzenesulfonylhydrazone of p-fluorobenzaldehyde:

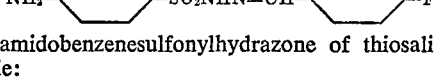

p-acetamidobenzenesulfonylhydrazone of thiosalicylaldehyde:

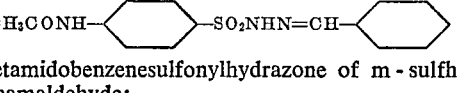

p - acetamidobenzenesulfonylhydrazone of m - sulfhydryl cinnamaldehyde:

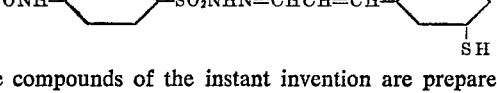

The compounds of the instant invention are prepared by reacting the aldehyde or ketone with the substituted benzenesulfonylhydrazine desired. This may be the p-aminobenzenesulfonylhydrazine or the p-acetamidobenzenesulfonylhydrazine. The reaction is carried out advantageously in a solvent; and the solvents preferred for use are water, alcohol, dioxane or mixtures thereof. The instant hydrazines are relatively insoluble in the solvents;

and the reaction is facilitated by the application of external heat and stirring. The selected hydrazine is first placed in the solvent and heat is applied with stirring, so as to obtain a solution or a slurry; then substantially an equal molar quantity of the aldehyde or ketone is added, preferably a small amount at a time with stirring, until the reaction is completed, as evidenced by a homogeneous appearance of the reaction mixture. The entire reaction period is only 5 to 10 minutes ordinarily. The product separates from the reaction mixture on cooling to room temperature and may be easily separated therefrom; and the crude product may be re-crystallized from alcohol, water, dioxane or a mixture thereof to yield a relatively pure product.

Example 1 p-Aminobenzenesulfonylhydrazine (0.027 mol) is dissolved in 100 ml. of hot methanol to which a few drops of water have been added. To this is added a second solution containing 0.027 mol of 5-nitrosalicylaldehyde in 50 ml. of hot methanol, with stirring. The reaction mixture is permitted to cool to room temperature and bright yellow crystals precipitate therefrom. The crystals are collected on a suction filter and dried at 95° C. in an oven. The resulting crude product was obtained in an 87% yield and melted with decomposition at 205–207° C. The crude product is re-crystallized from hot methanol to which a little water has been added and the resulting product is obtained in a yield of 54% in the form of bright yellow crystals melting with decomposition at 208–209° C. Analysis for p-aminobenzenesulfonylhydrazone of 5-nitrosalicylaldehyde: calculated for $C_{13}H_{12}N_4O_5S$ is C=46.43, H=3.60, N=16.66; and found: C=45.86, 46.02, H=3.50, 3.30, N=16.18, 16.38.

Example 2 p-Aminobenzenesulfonylhydrazine (0.040 mol) is dissolved in a hot solution composed of 50 ml. of methanol and 50 ml. of water. Salicylaldehyde (0.040 mol) is added with stirring and the reaction mixture develops an orange-yellow color and becomes almost homogeneous. Shortly thereafter upon cooling yellow-orange crystals begin to precipitate from the reaction mixture; and separation of such crystals is facilitated by dilution of the reaction mixture with water. The crystals are collected on a suction filter and air dried to obtain a product, in quantitative yield, melting with decomposition at 167–168° C. The true product is re-crystallized twice from aqueous methanol to obtain yellow crystals in a yield of 47% melting with decomposition at 176.5–177° C. Analysis for p-aminobenzenesulfonylhydrazone of salicylaldehyde: calculated for $C_{13}H_{13}N_3O_3S$ is C=53.60, H=4.50, N=14.42; and found: C=53.71, H=4.60, N=14.36.

Example 3 p-Acetamidobenzenesulfonylhydrazine (0.04 mol) is suspended with stirring in a mixture of 50 ml. of methanol and 50 ml. of water. The mixture is warmed and o-hydroxyacetophenone (0.04 mol) along with three drops of glacial acidic acid is added. The reaction mixture becomes homogeneous in a few moments and then an amorphous cream colored solid begins to separate from the reaction mixture. The reaction mixture is permitted to stand for a few hours at room temperature and then the solid precipitate is collected on a suction filter and dried in an oven at 95° C. The resulting cream colored material, obtained in a yield of 90%, melts with decomposition at 215–218° C. The product is re-crystallized from a mixture of 800 ml. of methanol, 75 ml. of dioxane, and 75 ml. of water to obtain a yield of 52%, in the form of colorless crystals melting with decomposition at 219–220° C. Analysis for p-acetamidobenzenesulfonylhydrazone of o-hydroxyacetophenone: calculated for $C_{16}H_{17}N_3O_4S$ is C=55.32, H=4.93, N=12.10; and found: C=55.13, H=5.09, N=11.91.

Example 4

A procedure is carried out that is the same as that of Example 1, except that vanillin is used in place of the 5-nitrosalicylaldehyde and the resulting product is a white crystalline material melting with decomposition at 174–175° C. Analysis for p-aminobenzenesulfonylhydrazone of vanillin: calculated for $C_{14}H_5N_3O_3S$ is C=52.33, H=4.71, N=13.08; and found: C=52.38, H=4.79, N=13.32.

Example 5

A procedure is carried out that is the same as that of Example 2, except that 3,4-dichlorobenzaldehyde is used in place of the salicylaldehyde, and the resulting product is a white crystalline material melting with decomposition at 168–169° C. Analysis for p-aminobenzenesulfonylhydrazone of 3,4-dichlorobenzaldehyde: calculated for $C_{13}H_{11}Cl_2N_3O_2S$ is C=45.36, H=3.22, N=12.21; and found: C=45.21, H=3.23, N=12.28.

Example 6

A procedure is carried out that is the same as that of Example 2, except that o-nitrobenzaldehyde is used in place of the salicylaldehyde, and the resulting product is a yellow crystalline material melting with decomposition at 168–169° C. Analysis for p-aminobenzenesulfonylhydrazone of o-nitrobenzaldehyde: calculated for $C_{13}H_{12}N_4O_4S$ is C=48.74, H=3.78, N=17.49; and found: C=48.60, H=3.77, N=17.90.

Example 7

A procedure is carried out that is the same as that of Example 3, except that salicyladehyde is used in place of the o-hydroxyacetophenone, and the resulting product is a pale yellow crystalline material melting with decomposition at 225.5–226° C. Analysis of p-acetamidobenzenesulfonylhydrazone of salicylaldehyde: calculated for $C_{15}H_{15}N_3O_4S$ is C=54.04, H=4.54; and found: C=54.34, N=4.69.

Example 8

A procedure is carried out that is the same as that of Example 3, except that m-nitrobenzaldehyde is used in place of the o-hydroxyacetophenone, and the resulting product is a white crystalline material melting with decomposition at 211–212° C. Analysis for p-acetamidobenzenesulfonylhydrazone of m-nitrobenzaldehyde: calculated for $C_{15}H_{14}N_4O_5S$ is C=49.71, H=3.89, N=15.46; and found: C=49.70, H=3.67, N=14.66, 14.87.

Example 9

A procedure is carried out that is the same as that of Example 3, except that 2-hydroxy-3-nitro-5-methyl acetophenone is used in place of the o-hydroxyacetophenone, and the resulting product is in the form of yellow flakes melting with decomposition at 241–241.5° C. Analysis for p-acetamidobenzenesulfonylhydrazone of 2-hydroxy-3-nitro-5-methyl acetophenone: calculated for $C_{17}H_{18}N_4O_6S$ is C=50.24, H=4.46; and found: C=50.47, H=4.24.

Example 10

A procedure is carried out that is the same as that of Example 3, except that 5-nitrosalicylaldehyde is used in place of the o-hydroxyacetophenone, and the resulting product is a pale yellow amorphous material melting with decomposition at 238–238.5° C. Analysis for p-acetamidobenzenesulfonylhydrazone of 5-nitrosalicylaldehyde: calculated for $C_{15}H_{14}N_3O_6S$ is C=47.61, H=3.73; and found: C=48.18, H=3.81.

Example 11

A procedure is carried out that is the same as that of Example 1, except that o-hydroxyacetophenone is used in place of the 5-nitrosalicylaldehyde, and the resulting product is a white crystalline material melting with decomposition at 184–185° C. Analysis for p-aminobenzenesulfonylhydrazone of o-hydroxyacetophenone: calculated for $C_{14}H_{15}N_3O_3S$ is C=55.07, H=4.95, N=13.76; and found: C=54.76, H=4.94, N=13.66.

Example 12

A procedure is carried out that is the same as that of Example 3, except that 2,4-dichlorobenzaldehyde is used in place of the o-hydroxyacetophenone, and the resulting product is in the form of white crystals melting with decomposition at 216–217° C. Analysis for p-acetamidobenzenesulfonylhydrazone of 2,4-dichlorobenzaldehyde: calculated for $C_{15}H_{13}Cl_2N_3O_3S$ is C=46.64, H=3.39, N=10.88; and found: C=46.39, H=3.46, N=10.66.

Example 13

A procedure is carried out that is the same as that of Example 3, except that 5-chlorosalicylaldehyde is used in place of the o-hydroxyacetophenone, and the resulting product is in the form of white crystals melting with decomposition at 215–216° C. Analysis for p-acetamidobenzensulfonylhydrazone of 5-chlorosalicylaldehyde: calculated for $C_{15}H_{14}ClN_3O_4S$ is C=48.98, H=3.84, N=11.42; and found: C=49.13, H=3.36, N=11.18.

Example 14

A procedure is carried out that is the same as that of Example 3, except that 3,4-dichlorobenzaldehyde is used in place of the o-hydroxyacetophenone, and the resulting product is in the form of white crystals melting with decomposition at 192–193° C. Analysis for p-acetamidobenzenesulfonylhydrazone of 3,4-dichlorobenzaldehyde: calculated for $C_{15}H_{13}Cl_2N_3O_3S$ is C=46.64, H=3.39, N=10.87; and found: C=46.87, H=3.39, N=10.49.

Example 15

A procedure is carried out that is the same as that of Example 3, except that 2,4-dihydroxybenzaldehyde is used in place of the o-hydroxyacetophenone, and the resulting product is in the form of pale yellow crystals melting with decomposition at 196–198° C. Analysis for p-acetamidobenzenesulfonylhydrazone of 2,4-dihydroxybenzaldehyde: calculated for $C_{15}H_{15}N_3O_5S$ is C=51.57, H=4.33; and found: C=51.47, H=4.50.

Example 16

A procedure is carried out that is the same as that of Example 3, except that o-chlorobenzaldehyde is used in place of the o-hydroxyacetophenone, and the resulting product is in the form of white crystals melting with decomposition at 209–210° C. Analysis for p-acetamidobenzenesulfonylhydrazone of o-chlorobenzaldehyde: calculated for $C_{15}H_{14}ClN_3O_3S$ is C=51.21, H=4.01; and found: C=51.29, H=4.16.

Example 17

A procedure is carried out that is the same as that of Example 3, except that p-hydroxybenzaldehyde is used in place of the o-hydroxyacetophenone, and the resulting product is in the form of yellow crystals melting with decomposition of 135–136° C. Analysis for p-acetamidobenzenesulfonylhydrazone of p-hydroxybenzaldehyde: calculated for $C_{15}H_{15}N_3O_4S$ is C=54.04, H=4.53, N=12.60; and found: C=53.86, H=4.63, N=12.49.

Example 18

A procedure is carried out that is the same as that of Example 1, except that 2-hydroxy-3-nitro-5-methylacetophenone is used in place of the 5-nitrosalicylaldehyde, and the resulting product is a bright yellow crystalline material melting with decomposition at 224–225° C. Analysis for p-aminobenzenesulfonylhydrazone of 2-hydroxy-3-nitro-5-methylacetophenone: calculated for $C_{15}H_{16}N_4O_5S$ is C=49.44, H=4.43, N=15.38; and found: C=49.38, H=4.53, N=15.23.

Example 19

A procedure is carried out that is the same as that of Example 1, except that 2-hydroxy-3-methyl-5-nitroacetophenone is used in place of the 5-nitrosalicylaldehyde, and the resulting product is a bright yellow crystalline material melting with decomposition at 262–263° C. Analysis for p-aminobenzenesulfonylhydrazone of 2-hydroxy-3-methyl-5-nitroacetophenone: calculated for $C_{15}H_{16}N_4O_5S$ is C=49.44, H=4.43, N=15.38; and found: C=49.62, H=4.58, N=15.25.

Example 20

A procedure is carried out that is the same as that of Example 1, except that 5-chlorosalicylaldehyde is used in place of the 5-nitrosalicylaldehyde, and the resulting product is in the form of tan crystals melting with decomposition at 193–194° C. Analysis for p-aminobenzenesulfonyhydrazone of 5-chlorosalicylaldehyde: calculated for $C_{13}H_{12}ClN_3O_3S$ is C=47.92, H=3.71, N=12.90; and found: C=47.68, H=3.91, N=12.69.

Example 21

A procedure is carried out that is the same as that of Example 1, except that o-chlorobenzaldehyde is used in place of the 5-nitrosalicylaldehyde, and the resulting product is in the form of almost colorless crystals melting with decomposition at 149–149.5° C. Analysis for p - aminobenzesulfonylhydrazone of o - chlorobenzaldehyde: calculated for $C_{13}H_{12}ClN_3O_2S$ is C=50.40, H=3.90, N=13.56; and found: C=50.43, H=3.81, N=13.47.

Example 22

A procedure is carried out that is the same as that of Example 1, except that o-nitrocinnamaldehyde is used in place of the 5-nitrosalicylaldehyde, and the resulting product is a yellow amorphous material melting with decomposition at 161–162° C. Analysis for p-aminobenzenesulfonylhydrazone of o-nitrocinnamaldehyde: calculated for $C_{15}H_{14}N_4O_4S$ is C=52.01, H=4.07, N=16.18; and found: C=52.11, H=4.10, N=16.05.

Example 23

A procedure is carried out that is the same as that of Example 1, except that 2,4-dihydroxyacetophenone is used in place of the 5-nitrosalicylaldehyde, and the resulting product is a white crystalline material melting with decomposition at 212–213° C. Analysis for p-aminobenzenesulfonylhydrazone of 2,4-dihydroxyacetophenone: calculated for $C_{14}H_{15}N_3O_4S$ is C=52.32, H=4.70, N=13.08; and found: C=52.39, H=4.76, N=13.00.

Example 24

A procedure is carried out that is the same as that of Example 1, except that p-hydroxybenzaldehyde is used in place of the 5-nitrosalicylaldehyde, and the resulting product is a peach colored crystalline material melting with decomposition at 154–154.5° C. Analysis for p-aminobenzesulfonylhydrazone of p - hydroxybenzaldehyde: calculated for $C_{13}H_{13}N_3O_3S$ is C=53.59, H=4.49, N=14.42; and found: C=53.45, H=4.57, N=14.62.

Example 25

A procedure is carried out that is the same as that of Example 1, except that m-nitrobenzaldehyde is used in place of the 5-nitrosalicylaldehyde, and the resulting product is in the form of pale yellow crystals melting with decomposition at 129–130° C. Analysis for p-aminobenzenesulfonylhydrazone of m-nitrobenzaldehyde: calculated for $C_{13}H_{12}N_4O_4S$ is C=48.74, H=3.77, N=17.49; and found: C=48.53, H=3.88, N=17.36.

The other p-aminobenzenesulfonylhydrazones and p-acetamidobenzesulfonylhydrazones of the invention may be prepared by the procedures of Examples 1 and 3, respectively, using the corresponding aldehydes or ketones in place of those specified in these procedures.

The compounds of the invention just described show peak absorptions of light radiation in the neighborhood of 2970 A. and low absorption of light radiation in the neighborhood of 3400 A., so that they may be used in sun tan lotions. These compounds also undergo decomposition upon melting. With respect to anti-bacterial activity, it will be noted that p-aminobenzenesulfonyhydrazone of vanillin exhibits anti-bacterial activity with respect to *Streptococcus pyogenes*; p-aminobenzenesulfonylhydrazone of 5-nitrosalicylaldehyde exhibits particularly strong anti-bacterial activity with respect to *Micrococcus pyogenes*; p-aminobenzenesulfonylhydrazone of o-hydroxyacetophenone exhibits some anti-bacterial activity with respect to *Escherichia coli* and unusually strong anti-bacterial activity with respect to *Streptococcus pyogenes*; and p-amino benzenesulfonylhydrazone of salicylaldehyde exhibits greater anti-bacterial activity than sulfadiazine with respect to *Streptococcus pyogenes* and *Escherichia coli*.

It will be understood that modifications and variations may be effected without departing from the spirit and scope of the novel concepts of the present invention.

I claim as my invention:
1. A compound having the following formula:

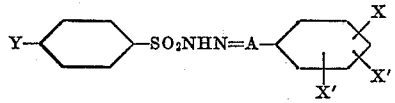

wherein Y is a monovalent radical selected from the group consisting of —NH$_2$ and —NHCOCH$_3$, A is a C$_1$–C$_6$ trivalent aliphatic hydrocarbon radical, the only unsaturation therein being in the form of a single olefinic linkage, X is selected from the group consisting of —OH, —SH, —NO$_2$ and halo radicals, and each X' is selected from the group consisting of —SH, —OH, —NO$_2$, halo, C$_1$–C$_4$ alkoxy, —H, and C$_1$–C$_6$ alkyl radicals; the radicals X, X' and X' totaling not more than one —OH, not more than one —NO$_2$, not more than one —SH, and not more than two halo groups.

2. p-Aminobenzenesulfonylhydrazone of salicylaldehyde.

3. p-Aminobenzenesulfonylhydrazone of o-hydroxyacetophenone.

4. p-Aaminobenzenesulfonylhydrazone of vanillin.

5. p-Aminobenzenesulfonylhydrazone of 5-nitrosalicylaldehyde.

References Cited in the file of this patent
UNITED STATES PATENTS 2,912,445    Zimmer  ---------------- Nov. 10, 1959

OTHER REFERENCES

Curtius et al.: J. Prakt. Chem., vol. 112, pp. 118–119, 127, 132 (1926).

Chemical Abstracts, vol. 41, pp. 5474–5477 (1947) [Abstract of Lehmann et al., Bull. Soc. Chim. Belges, vol. 55, pages 52–97 (1946)].

Lehmann et al., Bull. Soc. Chim. Belges, vol. 55, pp. 66 to 67, 82 to 85, and 92 to 95 (1946).

Frear et al., J. of Economic Entomology, vol. 40, pp. 736–740 (1947).